Patented Apr. 26, 1938

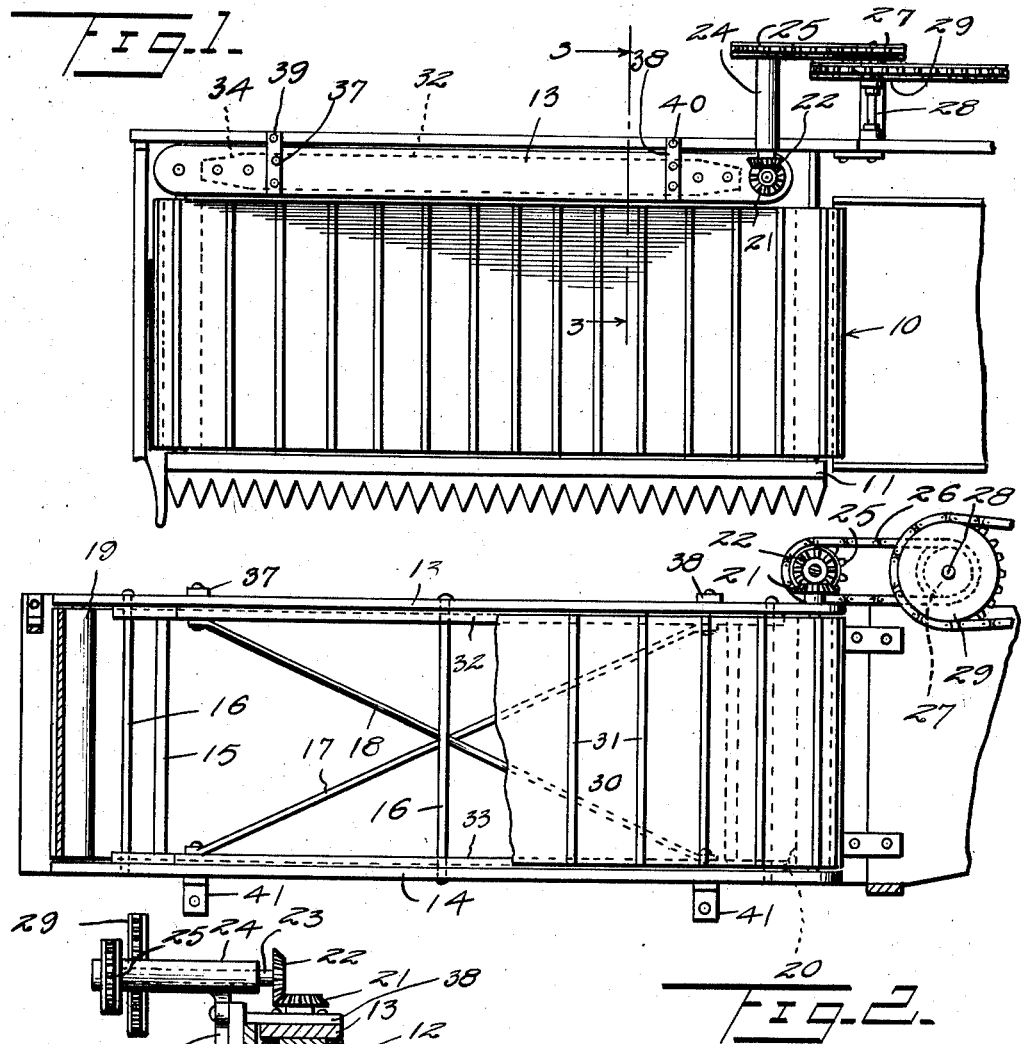

2,115,662

UNITED STATES PATENT OFFICE 2,115,662

ATTACHMENT FOR COMBINES

Taylor Alderson, Chapin, Ill.

Application September 14, 1937, Serial No. 163,849

1 Claim. (Cl. 56—466)

This invention relates to harvesting machines, and more particularly, to an attachment for the movable platform which is positioned immediately adjacent and rearwardly of the mower or cutter.

An object of this invention is to provide a means in the form of an attachment which can be readily placed on a harvesting machine, which is provided with a stationary vertical shield at one edge of the movable platform, so that the material cut by the mower will not become bunched or tangled as the platform moves toward the balance of the machine.

Another object of this invention is to provide an attachment of this character which is so constructed that it can be easily mounted on the present parts of the harvester, and which is so constructed that it can be easily removed from the machine as desired.

With the foregoing and other objects in view, the invention will be more fully described hereinafter, and will be more particularly pointed out in the claim appended thereto.

In the drawing, wherein like symbols refer to like or corresponding parts throughout the several views.

Figure 1 is a detailed top plan of a device constructed according to an embodiment of this invention mounted on a harvesting machine, or combine, the harvesting machine being shown in fragmentary form.

Figure 2 is a detailed front elevation of the attachment partly broken away and partly in vertical section.

Figure 3 is a sectional view taken on the line 3—3 of Figure 1.

Referring to the drawing, the numeral 10 designates generally, a movable platform or conveyor which is disposed immediately rearwardly of the mower 11 forming a part of the harvesting machine. This conveyor 10 is operated (by means not shown) and moves continuously toward the right as viewed in Figure 1 so that the material cut by the mower 11 is moved toward the balance of the machine which separates the grain from the straw and other rejectionable material.

At the present time, the combines are provided with a stationary back wall disposed adjacent the rear edge of the platform or conveyor 10, and this shield has a tendency to cause bunching or tangling of the straw or grain so that when the material is moved toward the grain cleaning and separating means forming part of the combine, there is a tendency for the bunched or tangled material to clog up the working parts of the machine. In order, therefore, to provide a means whereby the cut grain will not become tangled or bunched on the conveyor 10, I have provided a movable shield generally designated as 12 which is disposed at the rear edge of the horizontal platform 10.

This movable shield or wall 12 comprises upper and lower frame members 13 and 14 which are held in spaced-apart relation to each other by means of vertical spacing members 15 disposed inwardly of each end of the upper and lower frame members 13 and 14 respectively. Tie bars 16 extend between the frame members 13 and 14 and hold the frame members in assembled parallel relation. A pair of crossed bracing bars 17 and 18 are secured between the frame members 13 and 14 intermediate the spacing members 15, as shown in Figure 2.

An outer roller 19 has the opposite ends thereof journaled in the frame members 13 and 14 adjacent the outer ends of these frame members and an inner roller 20 is journaled at the inner end of the frame members 13 and 14 and is provided at its upper end with a beveled gear 21. Beveled gear 21 meshes with a beveled gear 22 which is mounted on a shaft 23 journaled in a bearing 24. The shaft 23 is driven by means of a sprocket 25 which is fixed thereto, the sprocket 25 having a chain 26 engaged therewith and the chain 26 engaging a driving gear 27 mounted on a rotating shaft 28. The shaft 28 is rotated by means of a sprocket 29 driven from a suitable part of the harvester.

An endless web 30 is trained about the rollers 19 and 20 and is provided on its outer surface with a plurality of parallel spaced-apart slats 31. The parallel runs of the conveyor or web 30 engage against upper and lower guide members 32 and 33 which are secured to the upper and lower frame members 13 and 14 respectively.

The opposite ends of the guide members 32 and 33 are preferably tapered off as at 34 so that the ends of the guide members will not injure the fabric of which the conveyor 30—31 is constructed. The bearing 24 for the shaft 23 is secured to a substantially T-shaped bracket 35 which is fastened by means of bolts or the like to a suitable part of the frame of the harvester, preferably the stationary or vertical wall 36 forming the shield for the harvester.

The frame comprising the upper and lower frame members 13 and 14, together with the spacing members 15, tie bars 16 and bracing bars 17 and 18, is held in vertical position immediately in front of the stationary back wall or shield 36 of the harvester and between the latter and the laterally traveling apron 10, by means of straps 37 and 38 that are secured to the upper frame member 13, and which extend rearwardly thereof and over the top edge of the stationary shield 36. These straps 37 and 38 are fastened by means of bolts 39 and 40 respectively. The lower frame member 14 is provided on its underside with a pair of angular or L-shaped brackets 41, the horizontal legs of which are secured as by bolts 42 to the lower surface of the frame member 14, and the vertical legs of which are engaged over a frame member 43 forming part of the supporting structure for the platform 10 and between said frame member 43 and the lower edge of the stationary shield 36, as best illustrated in Fig. 3.

In use and operation of this device when the harvester is moving along during the cutting operation, the platform 10 will be moving with the upper surface thereof moving inwardly of the harvester so as to move the material inwardly into the machine for action by the machine to separate the grain from the rejected material. At the same time that the horizontal conveyor or platform 10 moves inwardly and the mower 11 is cutting the grain, the vertical conveyor 12 will have its forward run thereof moving in the same direction as the upper run of the conveyor 10 and at substantially the same speed. In this manner any material engaging on the upper surface of the conveyor 10 will be moved thereby, and any material which contacts with the forward wall of the conveyor 12 will also be moved inwardly of the machine and at the same rate of speed that the material is moving on the conveyor 10.

The material will, therefore, not be retarded as is the case with a stationary wall or shield forming part of the conventional harvesting machines and it will not be necessary to stop the operation of the harvester in order to remove bunches of material such as are formed with the present structure of the harvester. The conveyor 12, including the frame members 13 and 14, can be quickly removed from the machine by unfastening the bolts 39 and 40 and then lifting the frame off of the frame member 43 of the harvester.

It will be apparent from the foregoing, an exceedingly simple attachment has been provided for a harvester which can be easily and quickly connected to the present parts of the harvester without undue changes in the arrangement of such present parts. This device is also so constructed that it will not require a great degree of power in order to operate the same during the operation of the harvester.

It is, of course, understood that various changes and modifications may be made in the details of construction and design of the above specifically described embodiment of this invention without departing from the spirit thereof, such changes and modifications being restricted only by the scope of the following claim.

I claim:

In a harvesting combine, the combination with the horizontally disposed movable platform thereof, a frame bar in the rear of said platform and the relatively stationary vertically disposed shield at the rear of said platform and above said bar, of a framework disposed in front of said shield and between the latter and the movable platform, an endless web mounted in said framework and provided with vertically disposed slats, rollers journaled in said framework and over which said endless web passes, means for moving said endless web, said framework embodying upper and lower horizontally disposed frame bars, transversely extending straps secured to the upper frame bar of the framework and extending over and detachably connected to the upper edge of the stationary shield, and angular brackets secured to the lower frame bar of the framework and adapted to be engaged over the upper edge of the platform frame bar and between the latter and the lower edge of the stationary shield whereby to hold the framework in place.

TAYLOR ALDERSON.